United States Patent Office 2,957,035
Patented Oct. 18, 1960

2,957,035
COPOLYMERIZABLE METHYLENE-SUBSTITUTED CYCLOALKENES, THEIR PREPARATION, COATING COMPOSITIONS CONTAINING THEM AND POLYMERS THEREOF

Richard E. Benson, Claymont, Del., assignor to E. I. du Pont de Nemours and Company, Wilmington, Del., a corporation of Delaware No Drawing. Filed Apr. 26, 1957, Ser. No. 655,170

23 Claims. (Cl. 260—666)

This invention relates to new, highly unsaturated cyclic compounds. More particularly, this invention relates to a new class of methylene-substituted cycloalkenes, their preparation, and their polymerization products. Still more particularly, this invention relates to a new class of dimethylenecyclohexenes and trimethylenecyclooctenes and their preparation, to air-drying compositions containing them, and to their polymerization products.

This application is a continuation-in-part of my copending patent application Serial No. 591,027, filed June 13, 1956, now abandoned.

Recently, 4,5-dimethylenecyclohexenes have been reported by Bailey et al., J. Am. Chem. Soc. 77, 73, 1163 (1955). On bromination, 4,5-dimethylenecyclohexene gives primarily alicyclic bromides devoid of aromatic properties, including a tetrabromide which can be isolated, and only very small amounts of aromatic bromo compounds. Furthermore, these prior art 4,5-dimethylenecyclohexenes enter readily into the Diels-Alder reaction with the many unsaturated materials known to undergo this condensation, this reaction yielding monomeric adducts. The new dimethylenecyclohexenes of this invention differ from the prior art compounds in both respects.

It is an object of this invention to provide a new class of dimethylenecyclohexenes and trimethylenecyclooctenes. Another object is to provide a novel process for the preparation of these new cycloalkenes. A further object is to provide a catalytic process for the preparation of new cycloalkenes employing acetylene or a monoacetylenic hydrocarbon as a reactant. A still further object is to provide a novel class of polymeric products which are the polymers and copolymers obtained from these new cycloalkenes, particularly from the new dimethylenecyclohexenes. Yet another object is to provide air-drying compositions containing the new cycloalkenes, these compositions being eminently suitable for the coating of various substrates. Other objects will appear hereinafter.

These and other objects of this invention are accomplished by providing a new class of methylene-substituted cycloalkenes which are the cyclic addition products of one mole of a monoacetylenic hydrocarbon to from two to three moles of allene, these products being obtained by the process described below. These new cycloalkenes have, in addition to their methylene substituents, at most two substituents which are attached to the cycloalkene ring carbon atoms in the 1- and 2-positions, these substituents being hydrocarbon radicals. The polymerization products of these compounds are also new and form part of this invention. Also included in the invention are compositions, capable of air-drying to solvent-resistant films, containing these cycloalkenes.

The new products of this invention comprise, on the one hand, 3,5-dimethylenecyclohexenes represented by the general formula:

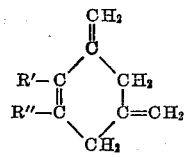

wherein R' and R" are hydrogen or hydrocarbon radicals, preferably of 1–6 carbon atoms. Thus, R' and R" can be hydrogen, alkyl, alkenyl, cycloalkyl or aryl, preferably of not more than 6 carbon atoms. The new dimethylenecyclohexenes of this invention show a striking difference from the prior art 4,5-dimethylenecyclohexenes in their chemical behavior. In contrast, to 4,5-dimethylenecyclohexene which, when brominated, gives primarily alicyclic compounds, the 3,5-dimethylenecyclohexenes on bromination undergo a remarkable reaction giving principally aromatic compounds, such as alpha,-alpha'-dibromo-m-xylene with some alpha-bromo-m-xylene. Furthermore, they do not give Diels-Alder adducts. However, they can be readily converted to m-xylene or hydrocarbon-substituted m-xylenes free from other isomeric xylenes.

In addition to 3,5-dimethylenecyclohexenes, the process of this invention gives, in small amounts, new 3,5,7-trimethylenecyclooctenes represented by the formula

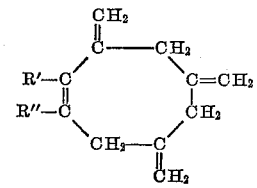

where R' and R" have the previously stated significance, i.e. hydrogen or hydrocarbon radicals, preferably of 1 to 6 carbon atoms, such as alkyl, alkenyl, cycloalkyl or aryl.

Either of these two classes of cycloalkenes or preferably, their mixture as obtained directly from the process described below, has the property of setting rapidly by air-drying to solvent-resistant films when exposed to air, the drying being accelerated by addition of a conventional drying agent, e.g., a cobalt drying agent. Furthermore, these cycloalkenes are polymerizable by themselves or in admixture with other polymerizable unsaturates, as described below.

The new cycloalkenes of this invention are obtained by the process which comprises contacting and reacting, in the presence of a catalyst comprising a nickel derivative of a weak acid having a dissociation constant below $9 \times 10^{-10}$, allene with a monoacetylenic hydrocarbon. The monoacetylenic hydrocarbon reactants include acetylene and acetylenic hydrocarbons in which the substituents attached to the triply bonded carbon atoms are hydrocarbon radicals. These acetylenic hydrocarbons can be represented by the general formula R'—C≡C—R" wherein R' and R" are hydrogen or hydrocarbon radicals, such as alkyl, alkenyl, cycloalkyl or aryl, preferably of not more than 6 carbon atoms.

The reaction involved is the addition of one mole of the acetylenic hydrocarbon to either two or three moles of allene. The first type of addition, which predominates leads to 3,5-dimethylenecyclohexene and 1-, 2- and 1,2-substituted-3,5-dimethylenecyclohexenes; the second type leads to 3,5,7-trimethylenecyclooctene and 1-, 2- and 1,2-substituted-3,5,7-trimethylenecyclooctenes, which are obtained in much smaller amounts. The reactions can be represented schematically as follows:

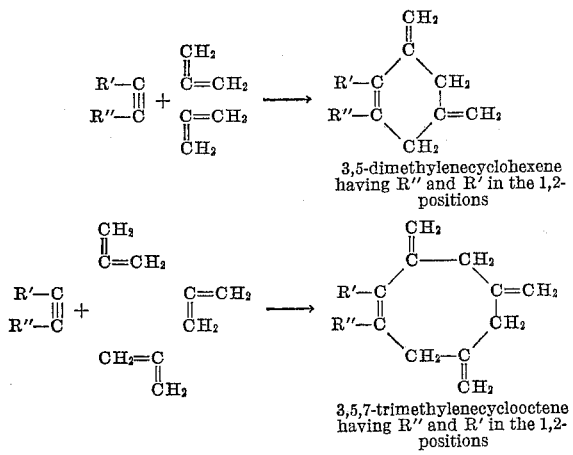

The relative proportions of the two reactants are not critical. The method theoretically requires at least two moles of allene per mole of acetylenic hydrocarbon but these proportions need not be closely observed. For example, it may be advantageous to use an excess of a cheap reactant like acetylene. Substituted acetylenes are desirably used in approximately the required proportions with respect to allene but this is by no means essential.

Specific catalysts for this reaction are the nickel compounds in which the nickel is loosely bound to the anion. More specifically, these compounds are derivatives, or "salts," of very weak acids having a dissociation constant less than about $9 \times 10^{-10}$. Suitable catalysts include nickel cyanide, nickel thiocyanate, nickel hydroxide, nickel ethyl mercaptide, nickel glycinate, nickel borate, nickel dimethylglyoxime, and the like.

Especially effective catalysts are the nickel coordination compounds, or chelates, of compounds capable of existing in enol form. These include the nickel chelates of 1,3-dicarbonyl compounds such as beta-keto-esters, beta-ketoaldehydes and 1,3-diketones and other nickel "enolates." Examples of suitable nickel chelates are the nickel salts of the enol form of ethyl acetoacetate, ethyl beta-methylacetoacetate, ethyl alpha-phenylacetoacetate, methyl alpha-benzylacetoacetate, ethyl 3,5-diketopimelate, methyl benzoylacetate, acetylacetone, 3-methylpentane-2,4-dione, 2-carbethoxycyclopentane-1-one, ethyl salicylate, salicylaldehyde, 2-formylcyclohexane-1-one, o-hydroxyacetophenone, ethyl acetonedicarboxylate, benzoylacetone, and the like. The preferred catalysts are nickel cyanide and the nickel coordination compounds of 1,3-dicarbonyl compounds containing only carbon and hydrogen besides the keto oxygens. The nickel compound need be used only in catalytic amounts, e.g., in such amounts that there is present from about 0.005 to 0.05 gram-atom of nickel per mole of allene. Higher amounts can be used but it is unnecessary to do so.

The reaction can proceed without diluent or solvent, particularly when the acetylenic hydrocarbon is liquid under the reaction conditions. In general, however, it is preferable to employ a liquid reaction medium. For this purpose, any substantially anhydrous organic liquid which is essentially neutral in reaction and has no appreciable effect on the reactants or reaction product can be used. The preferred reaction media are those liquids which contain no active hydrogen atoms, i.e., which do not evolve gas in the Zerewitinoff test for active hydrogen. Suitable reaction media include ethyl acetate, methylal, tetramethylene sulfone, tetrahydrofuran, acetone, dioxane, benzene, toluene, acetonitrile, and the like. The reaction mixture should be substantially anhydrous. In order to insure this condition, it is often desirable to add to it some calcium carbide, which binds any water present with formation of acetylene.

While the reaction will proceed slowly at room temperature of 20–25° C., it is desirable in practice to operate at higher temperatures, in the range of 50 to 150° C., and preferably in the range of from 75 to 100° C. Since allene is a gas, pressure resistant vessels should be used. The reaction can be carried out at the autogenous pressure developed by the reactants at the operating temperature or, when the acetylenic reactant is also gaseous, it can be pressured into the vessel and maintained at the desired pressure, e.g., at a pressure in the range of 100–300 lb./sq. in., throughout the reaction, until approximately the calculated amount of the acetylene has been reacted.

The resulting methylene-substituted cycloalkenes can be isolated from the reaction mixtures by any suitable means, conveniently by steam distillation or by fractional distillation or by both of these means. When acetylene itself is one of the reactants, some cyclooctatetraene is formed if an excess of acetylene (e.g. 0.75 mole or more per mole of allene) is used.

The monomeric cycloalkenes of this invention are colorless liquids possessing surprisingly good thermal stability, considering their structure. They are of highly unsaturated character, in view of the presence in the molecule of three or four double bonds of non-aromatic type. The 3,5-dimethylenecyclohexenes can be readily isomerized to the corresponding aromatic compounds which, in the case of 3,5-dimethylenecyclohexene itself, is m-xylene, the 1- or 2-substituted products giving the correspondingly substituted m-xylenes. This constitutes a convenient method of obtaining m-xylenes essentially free from position isomers.

The monomeric methylene-substituted cycloalkenes of this invention can be polymerized at low or moderate temperatures, e.g., in the range of −80 to 100° C., under the influence of ionic polymerization catalysts such as the halides of metals of groups III and IV (e.g., aluminum chloride, aluminum bromide, titanium tetrachloride, tin tetrachloride), sulfuric acid, boron trifluoride and the like. Depending upon the polymerization conditions, the polymers may be soluble, at least initially, in the common organic solvents such as the aromatic hydrocarbons, in which case they can be deposited on suitable substrates from solution to form shaped structures such as films, impregnating layers or self-supporting sheets; or they may be insoluble in the common solvents, in which case they can be pressed or molded into shaped structures. The presence of unsaturated groups in the polymers accounts for their ability to undergo crosslinking and become insoluble, in which state they possess valuable resistance to solvents and other chemicals such as water, soap solutions, etc.

The methylene-substituted cycloalkenes can also be copolymerized with other unsaturated monomers. The principal monomers suitable for copolymerization with the cycloalkenes are the conjugated dienes, maleic anhydride, styrene, and the like. These copolymers are also capable of crosslinking to give products of varying degrees of hardness and resistance to solvents and chemicals.

In addition to being polymerizable under the conditions just described, the cycloalkenes of this invention have the highly valuable property of polymerizing on oxidative drying. On exposure to air, the 3,5-dimethylenecyclohexenes and the 3,5,7-trimethylenecyclooctenes, separately or in admixture, form films which become gradually tack-free and insoluble in the common organic solvents. In order to take advantage of this property for the preparation of protective coatings, it is unnecessary to isolate the methylene-substituted cyclohexenes or cyclooctenes. It is, on the contrary, more advantageous to use the allene/acetylene reaction product as obtained, after removal of the solvent, if any, since it has been found that this crude reaction product air-dries as well as the isolated components.

The crude reaction product contains, in addition to the methylene-substituted cyclohexenes and cyclooctenes, varying amounts of the by-products already mentioned and of other unsaturated materials, including products boiling higher than the cyclooctenes. This mixture, as such and without separation, air-dries readily. It is therefore useful and valuable as such for use in coating and impregnating compositions.

This oxidative drying process is accelerated by adding to the cycloalkenes, or mixtures containing them, a small amount, e.g., 0.01–2% by weight of the liquid component, of one of the conventional drying agents employed in the drying of paints and varnishes. Many such driers are well known and in general use. The better known ones are oil-soluble salts of cobalt, manganese and lead, in particular salts of long chain (6 carbon or higher) aliphatic carboxylic acids such as octoates or linoleates, or other oil-soluble salts such as naphthenates and resinates. Other suitable metal driers are listed in textbooks in use in the paint, varnish and lacquer industry. The action of these driers can be intensified by adding to the air-drying compositions a small amount of an organic peroxide such as benzoyl peroxide. Compositions containing metal driers and the cycloalkenes of this invention are highly useful as coating compositions for porous or non-porous substrates such as wood, fabrics, iron or steel, and these compositions form part of this invention.

This invention is illustrated in greater detail by the following examples:

Example I

A stainless steel pressure vessel having a free space equivalent to 500 ml. was flushed with nitrogen and charged with 10 g. of nickel acetylacetonate, 10 g. of calcium carbide (to assure an anhydrous medium) and 150 ml. of dry tetrahydrofuran. The vessel was cooled in carbon dioxide/acetone, evacuated and 40 g. (1 mole) of allene was condensed into it, after which the vessel was sealed and allowed to warm up in a rocker. When the temperature reached about 20° C., acetylene was pressured into the vessel to a pressure of 150 lb./sq. in. The temperature of the vessel was then raised to 80° C. over a period of 1.5 hours with agitation and then held at 80° C. for 8 hours, during which time acetylene was repressured at 175–225 lb./sq. in. as needed. The acetylene pressure drop corresponded to the absorption of approximately 2.4 moles of acetylene.

The crude reaction product (256 g.) was combined with that of a similar run, which weighed 245 g. The combined liquid was separated by decantation from the calcium carbide and steam distilled. The water insoluble, yellow organic layer in the distillate was stabilized by addition of a little phenothiazine, separated and washed five times with water. This material, after drying over magnesium sulfate, weighed 143 g. Petroleum ether (300 ml.) was then added to this liquid and the resulting solution was extracted with 400 ml. of 25% aqueous silver nitrate solution in three portions and with 125 ml. of 50% aqueous silver nitrate solution in two portions to remove the cyclooctatetraene present. The resulting light green organic layer was dried over magnesium sulfate and distilled through a spinning band column to give 41.4 g. of colorless 3,5-dimethylenecyclohexene,

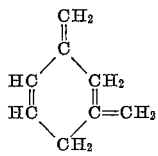

boiling at 60–73° C. at 85 mm. and, on redistillation, at 65–65.5° C. at 77 mm., $n_D^{25}$ 1.5130.

*Analysis.*—Calc'd for $C_8H_{10}$: C, 90.50; H, 9.50; hydrogenation (3 double bonds), 0.057 g. $H_2$/g. sample. Found: C, 90.37; H, 9.85; hydrogenation, 0.0511 g. $H_2$/g. sample.

The infrared spectrum showed the presence of two terminal methylene groups and of conjugated unsaturation.

The structure was further established through selective hydrogenation and through isomerization.

Hydrogenation in glacial acetic acid over a platinum oxide catalyst at room temperature and 40 lb./sq. in hydrogen pressure gave a product identified as a mixture of cis- and trans-1,3-dimethylcyclohexanes on the basis of analytical data, including infrared analysis.

Isomerization was brought about in different ways: (a) by heating at 80° C. with palladium-on-carbon; (b) by refluxing in tert.-butyl alcohol containing a small amount of potassium tert.-butoxide; and (c) by refluxing in chloroform containing some p-toluenesulfonic acid. In all cases, the isomerization product was principally m-xylene, as indicated by boiling point, refractive index and infrared and ultraviolet spectral analyses.

In spite of this ready isomerization in the presence of various agents, 3,5-dimethylenecyclohexene has surprising thermal stability. When heated with phenothiazine as inhibitor at 145–150° C. for 6.5 hours under nitrogen, over two-thirds of the triene is recovered unchanged.

The bromination of 3,5-dimethylenecyclohexene in carbon tetrachloride at room temperature in the presence of sodium bicarbonate yielded a mixture of products from which alpha-bromo-m-xylene (11%) and alpha, alpha'-dibromo-m-xylene (about 70%) were isolated.

In this and the following examples, liquid products boiling higher than the 3,5-dimethylenecyclohexenes were obtained. These higher boiling fractions contained the 3,5,7-trimethylenecyclooctenes with still higher boiling products.

Example II

A one-liter pressure vessel was charged with 10 g. of anhydrous nickel cyanide, 15 g. of pulverized calcium carbide and 200 ml. of tetrahydrofuran. Allene (80 g., 2.0 moles) was charged into the cold vessel, which was then pressured with acetylene and heated at 75–100° C. with agitation for 6 hours while repressuring with acetylene until a total of approximately 1.6 moles of acetylene was absorbed. At the end of 6 hours, the pressure had fallen to 35 lb./sq. in. The reaction product was steam-distilled and the organic layer in the distillate was washed with water, dried and distilled. There was obtained 47.6 g. (45% yield) of 3,5-dimethylenecyclohexene.

Example III

Example II was essentially repeated except that the catalyst was 9 g. of nickel ethyl acetoacetate. There was obtained a 37% yield of 3,5-dimethylenecyclohexene.

Example IV 1- and 2-methyl-3,5-dimethylenecyclohexene were prepared as follows: A mixture of 60 g. (1.5 moles) of allene, 30g. (0.75 mole) of methylacetylene, 10 g. of nickel acetylacetonate, 15 g. of ground calcium carbide and 200 ml. of tetrahydrofuran was heated at 80° C. for 1.5 hours in an agitated pressure vessel. Under these conditions, considerable allene and methylacetylene remained unreacted.

The reaction product was worked up as in Example I except that the washings with silver nitrate were omitted. There was obtained 5.6 g. of colorless 1- and 2-methyl-3,5-dimethylenecyclohexene, B.P. 80–81° C. at 60 mm., $n_D^{25}$ 1.5129–1.5134, in addition to 39.3 g. of higher boiling products.

*Analysis.*—Calc'd for $C_9H_{12}$: C, 89.94; H, 10.07. Found: C, 89.87; H, 10.09.

The infrared and nuclear magnetic resonance spectra were in agreement with the structural formulas.

The triene was isomerized to an aromatic structure by refluxing for three hours a chloroform solution containing it and a small amount of p-toluenesulfonic acid. The chloroform was removed by distillation and the remaining liquid was distilled. It was identified as being principally mesitylene (1,3,5-trimethylbenzene) on the basis of boiling point, refractive index and infrared analysis. The infrared analysis also showed that a small amount of 1,2,4-trimethylbenzene was present, thus indicating that the original triene was a mixture of 1-methyl- and 2-methyl-3,5-dimethylenecyclohexene.

Example V

A mixture of 1-phenyl- and 2-phenyl-3,5-dimethylenecyclohexene was prepared by heating for 8 hours at 80–84° C. a mixture of 62 g. (1.55 moles) of allene, 62 g. (0.6 mole) of phenylacetylene, 10 g. of nickel acetylacetonate, 15 g. of ground calcium carbide and 100 ml. of tetrahydrofuran. The tetrahydrofuran was removed by distillation from the reaction product and the remaining viscous liquid was heated in a vapor-bath still to a temperature of 200° C. at 1 mm. pressure. The resulting distillate (50 g.) was redistilled through a Vigreux column to give 24.9 g. of colorless liquid, B.P. 61–72° C. at 0.07 mm., and 10.6 g. boiling at 72° C. at 0.07 mm. These fractions were combined and redistilled. The product boiling at 77° C. at 0.2 mm. was a mixture of 1-phenyl- and 2-phenyl-3,5-dimethylenecyclohexene, as shown by nuclear magnetic resonance and infrared spectra and by acid-catalyzed isomerization to aromatic derivatives.

Example VI

A mixture of 1-vinyl- and 2-vinyl-3,5-dimethylenecyclohexene was prepared as follows: A 500 ml. stainless steel pressure vessel was charged by the procedure of Example I with 10 g. of nickel acetylacetonate, 10 g. of calcium carbide and 150 ml. of anhydrous tetrahydrofuran, then with 10 g. of monovinylacetylene and 19 g. of allene. It was then heated with agitation to 60° C. over a period of 2 hours, then at 70–72° C. for 5 hours, during which time the internal pressure fell from 80 to 49 lb./sq. in.

The crude reaction product was decanted from the calcium carbide, treated with 0.5 g. of phenothiazine to inhibit polymerization and distilled at 1–5 mm. pressure into a receiver cooled in a carbon dioxide/acetone bath. The distillate was redistilled to give 4.8 g. of 1- and 2-vinyl-3,5-dimethylenecyclohexene, B.P. 40–47° C. at 0.7–2.5 mm. On further fractionation, the product boiled at 44° C. at 2.9 mm., $n_D^{25}$ 1.5653. Its structure was confirmed by its infrared spectrum which showed the presence of the methylene groups and of the vinyl group.

*Analysis.*—Calc'd for $C_{10}H_{12}$: C, 90.90; H, 9.09. Found: C, 89.72; H, 9.13.

Example VII

The higher boiling fractions from several preparations of 3,5-dimethylenecyclohexene essentially as described in Example I were combined and distilled through an efficient column. A small amount of an intermediate cut (fraction A) B.P. 40–68° C. at 11 mm. pressure, was obtained along with a colorless oil (fraction B) boiling at 69.5–70° C. at 11 mm., $n_D^{25}$ 1.5217–1.5221. Fraction B was identified as 3,5,7-trimethylenecyclooctene on the basis of elemental and spectral analysis. The conversion to 3,5,7-trimethylenecyclooctene was about 8%, based on the amount of allene employed.

*Analysis.*—Calc'd for $C_{11}H_{14}$: C, 90.35; H, 9.65; hydrogenation, 0.0552 g. $H_2$/g. sample. Found: C, 90.97; H, 9.72; hydrogenation, 0.0500 g. $H_2$/g. sample (91% of theory for 4 double bonds).

The infrared spectrum showed the presence of terminal methylene groups and of ring unsaturation. The proton magnetic resonance spectrum showed the presence of six hydrogen atoms attached to terminal methylene carbons and of two hydrogen atoms attached to carbon of a ring double bond. The latter two hydrogen atoms were not equivalent and only two of the terminal methylene groups were indicated to be equivalent. The presence of six hydrogen atoms attached to saturated carbon of the methylene type was also indicated. All these data are consistent with the structure 3,5,7-trimethylenecyclooctene.

Analysis of intermediate fraction A by vapor phase chromatography indicated that it was chiefly a mixture of 3,5-dimethylenecyclohexene and 3,5,7-trimethylenecyclooctene. The analysis also indicated the presence of small amounts of two additional components.

Example VIII 3,5-dimethylenecyclohexene was poured onto a glass plate and allowed to stand at room temperature and exposed to air. After about 20 hours, the monomer had polymerized to a soft film which became progressively less tacky.

Example IX 3,5-dimethylenecyclohexene containing a small amount of a drier consisting chiefly of cobalt 2-ethylhexoate was flowed out on a steel panel. The liquid layer set quickly to a viscous film on exposure to air. After about 16 hours at room temperature, the film was hard and only slightly affected by toluene. After five more days at room temperature, the film was no longer affected by toluene or other common solvents.

Example X 3,5,7-trimethylenecyclooctene containing a small amount of cobalt 2-ethylhexoate was flowed out on a glass panel. A soft film formed rapidly on exposure to air. After 24 hours the film was substantially unaffected by xylene.

Example XI

Allene and acetylene were reacted in the presence of nickel acetylacetonate essentially as described in Example I. The crude reaction product was filtered to remove the calcium carbide. A portion of the filtrate was heated on a steam bath to remove the tetrahydrofuran used as the solvent. Some of the liquid residue was treated with a small amount of cobalt 2-ethylhexoate and flowed out on a steel plate. After about 16 hours exposure to air at room temperature, the liquid reaction product had set to a hard, glossy film which was unaffected by toluene. After 8 days at room temperature, the film was unaffected by contact with a 1:1 xylene/butanol mixture.

Similar results were obtained when the crude reaction product was isolated by steam distillation followed by washing the distillate with water to remove the tetrahydrofuran.

Example XII

To 200 ml. of trifluoroacetic acid cooled to 0–5° C. was added dropwise and with stirring 7.8 g. of 3,5-dimethylenecyclohexene [the polymerization of styrene under the influence of trifluoroacetic acid has recently been reported, see Throssell et al., J. Am. Chem Soc. 78, 1122 (1956)]. A vigorous reaction took place with separation of a solid material. After stirring for 5 minutes the reaction mixture was poured into water. The aqueous mixture was allowed to stand for one hour after which it was filtered. The solid material was washed with water and dissolved in benzene, from which it was reprecipitated by pouring the solution into methanol. Polymerized 3,5-dimethylenecyclohexene was thus obtained as a slightly yellowish solid having a molecular weight of about 1600, as determined by cryoscopy in benzene. It could be pressed into films at 100° C. and 500 lb./sq. in. pressure.

Example XIII

A trace of boron trifluoride was added to 3,5-dimethylenecyclohexene in 20% concentration in petroleum ether, at −60° C. Polymerization took place at once to give a white solid polymer, insoluble in hot toluene or xylene and in other common organic solvents.

Example XIV

A trace of titanium tetrachloride was added to a 30% solution of 3,5-dimethylenecyclohexene in petroleum ether at −60° C. A white solid polymer formed at once. It was insoluble in boiling xylene.

Example XV

A solution of 5 g. of 3,5-dimethylenecyclohexene and 5 g. of maleic anhydride in 50 ml. of benzene was refluxed under nitrogen for 6 hours. The solid which had formed was separated by filtration. It was a polymeric material melting above 250° C., insoluble in hot benzene and chloroform, and containing 61.24% carbon and 5.20% hydrogen, which indicated it was a copolymer of 3,5-dimethylenecyclohexene and maleic anhydride. The filtrate from which this solid was separated gave on evaporation a viscous polymeric oil.

Example XVI

A solution of 1 ml. of 3,5-dimethylenecyclohexene and 4 ml. of styrene in 10 ml. of petroleum ether at −60° C. was treated with one drop of titanium tetrachloride. A white solid copolymer precipitated. It was insoluble in xylene, chlorinated diphenyl and benzyl benzoate.

Example XVII

An equimolar mixture of 3,5-dimethylenecyclohexene and ethyl azoformate, $C_2H_5OCO-N=N-COOC_2H_5$, was refluxed in hexane for 2.5 hours. Upon removal of the solvent from the reaction mixture there was obtained a viscous polymeric material, molecular weight 670, soluble in ether and in benzene, insoluble in petroleum ether.

Example XVIII

A small amount of boron trifluoride was added to 3,5,7-trimethylenecyclooctene in petroleum ether solution at about −60° C. Polymerization took place on warming to 0° C. to give a solid polymer insoluble in most common organic solvents.

While this invention has been illustrated in the foregoing examples with reference to certain specific starting materials, other monoacetylenic hydrocarbons as defined above can be reacted with allene under the described conditions, including ethylacetylene, n-propyl-acetylene, n-butylacetylene, isobutylacetylene, n-hexylacetylene, cyclohexylacetylene, dimethylacetylene, diethylacetylene, and the like. The products obtained from these reactants are, respectively, 1- and 2-ethyl-3,5-dimethylenecyclohexene and 1- and 2-ethyl-3,5,7-trimethylenecyclooctene; 1- and 2-n-propyl-3,5-dimethylenecyclohexene and 1- and 2-n-propyl-3,5,7-trimethylenecyclooctene; 1- and 2-n-butyl-3,5-dimethylenecyclohexene and 1- and 2-n-butyl-3,5,7-trimethylenecyclooctene; 1- and 2-isobutyl-3,5-dimethylenecyclohexene and 1- and 2-isobutyl-3,5,7-trimethylenecyclooctene; 1- and 2-n-hexyl-3,5-dimethylenecyclohexene and 1- and 2-n-hexyl-3,5,7-trimethylenecyclooctene; 1- and 2-cyclohexyl-3,5-dimethylenecyclohexene and 1- and 2-cyclohexyl-3,5,7-trimethylenecyclooctene; 1,2-dimethyl-3,5-dimethylenecyclohexene and 1,2-dimethyl-3,5,7-trimethylenecyclooctene; 1,2-diethyl-3,5-dimethylenecyclohexene and 1,2-diethyl-3,5,7-trimethylenecyclooctene. The more accessible and preferred products are the cycloalkenes obtained from acetylene itself and monosubstituted acetylenic hydrocarbons, in particular those hydrocarbons which, apart from the triple bond, are free from aliphatic unsaturation and have from 1 to 6 carbon atoms, such as monoalkyl monoacetylenes. These cycloalkenes have the general formulae given above in which R' and R" are hydrogen or aliphatically saturated hydrocarbon radicals, i.e., hydrocarbon radicals free from aliphatic unsaturation, such as alkyl and phenyl, these radicals having from 1 to 6 carbon atoms, and at least one of R' and R" is hydrogen. Thus, this invention includes 1- and 2-alkyl-3,5-dimethylenecyclohexenes, 1,2-dialkyl-3,5-dimethylenecyclohexenes, and 1- and 2-alkyl-3,5,7-trimethylenecyclooctenes and 1,2-dialkyl-3,5,7-trimethylenecyclooctenes.

The new dimethylenecyclohexenes of this invention are useful as a source of m-xylene or hydrocarbon-substituted m-xylenes essentially free from o- or p-xylenes. As has been shown, this is because of their ready isomerization under mild conditions to m-xylenes. The separation of the isomeric xylenes is a difficult and expensive process which, with respect to the meta derivatives, is made unnecessary by this invention. As is known, m-xylene is an important industrial chemical.

The 1- and 2-hydrogen-substituted 3,5-dimethylenecyclohexenes are readily isomerized to 1,3-dimethyl-5(or 6)-hydrocarbobenzes which are also valuable chemicals, for example as intermediates in the synthesis of artificial musks.

The 3,5-dimethylenecyclohexenes substituted or unsubstituted and the 3,5,7-trimethylenecyclooctenes, substituted or unsubstituted, or their mixtures, or compositions containing them in substantial amount, are useful as sources of crosslinkable polymers of special value as coating compositions for application to surfaces such as wood, textiles, plastics and particularly metals such as steel or aluminum, e.g., autobodies, refrigerators, furniture, etc. As has been shown, the cycloalkenes of this invention, whether isolated or as the crude reaction product, are valuable components of air-drying compositions well adapted to coating and impregnating uses.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $$\begin{array}{c} CH_2 \\ \| \\ C-CH_2 \\ R'-C \diagup \quad \diagdown C=CH_2 \\ R''-C \diagdown \quad \diagup CH_2 \\ CH_2-C \\ \| \\ CH_2 \end{array}$$

wherein R' and R" are monovalent radicals selected from the class consisting of hydrogen and hydrocarbon radicals of not more than 6 crabon atoms.

2. A solid, film-forming, insoluble polymer of a compound as set forth in claim 1 selected from the class consisting of homopolymers of said compound and copolymers of said compound with another polymerizable unsaturated monomer.

3. A liquid coating composition comprising a compound as set forth in claim 1 and a small amount of up to 2% by weight of a metal salt drier.

4. 3,5,7-trimethylenecyclooctene.

5. A solid, film-forming, insoluble polymer of 3,5,7-trimethylenecyclooctene selected from the class consisting of homopolymers of 3,5,7-trimethylenecyclooctene and copolymers of 3,5,7-trimethylenecyclooctene with another polymerizable unsaturated monomer.

6. A liquid coating composition comprising 3,5,7-trimethylenecyclooctene and a small amount of up to 2% by weight of a metal salt drier.

7. A compound of the formula

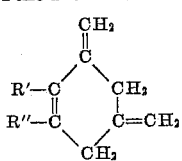

wherein R' and R'' are monovalent radicals selected from the class consisting of hydrogen and hydrocarbon radicals of not more than 6 carbon atoms.

8. A solid, film-forming insoluble polymer of a compound as set forth in claim 7 selected from the class consisting of homopolymers of said compound and copolymers of said compound with another polymerizable unsaturated monomer.

9. A liquid coating composition comprising a compound as set forth in claim 7 and a small amount of up to 2% by weight of a metal salt drier.

10. 3,5-dimethylenecyclohexene.

11. A solid, film-forming insoluble polymer of 3,5-dimethylenecyclohexene selected from the class consisting of homopolymers of 3,5-dimethylenecyclohexene and copolymers of 3,5-dimethylenecyclohexene with another polymerizable unsaturated monomer.

12. A liquid coating composition comprising 3,5-dimethylenecyclohexene and a small amount of up to 2% by weight of a metal salt drier.

13. A trimethylenecyclooctene having the three methylene groups in the 3-, 5- and 7-positions of the cyclooctene ring and having as the sole additional substituent a hydrocarbon radical of not more than 6 carbon atoms attached by a single bond to one of the carbon atoms in the 1- and 2-positions of the cyclooctene ring.

14. A dimethylenecyclohexene having the two methylene groups in the 3- and 5-positions of the cyclohexene ring and having as the sole additional substituent a hydrocarbon radical of not more than 6 carbon atoms attached by a single bond to one of the carbon atoms in the 1- and 2-positions of the cyclohexene ring.

15. A liquid coating composition comprising a mixture of 3,5-dimethylenecyclohexene and 3,5,7-trimethylenecyclooctene.

16. A liquid coating composition comprising a mixture of 3,5-dimethylenecyclohexene and 3,5,7-trimethylenecyclooctene and a small amount of up to 2% by weight of a metal salt drier.

17. A liquid coating composition comprising the cycloalkene reaction product obtained by reacting allene with a monoacetylenic hydrocarbon at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$, said monoacetylenic hydrocarbon having the formula R'—C≡C—R'' wherein R' and R'' are monovalent radicals selected from the class consisting of hydrogen and hydrocarbon radicals of not more than 6 carbon atoms.

18. A liquid coating composition comprising a small amount of up to 2% by weight of a metal salt drier and the cycloalkene reaction product obtained by reacting allene with a monoacetylenic hydrocarbon at a temperature of 20 to 150° C. under a pressure up to 300 lbs./sq. in. and at least the autogenous pressure of the reactants under the reaction conditions in the presence of a catalyst comprising a nickel salt of a weak acid having a dissociation constant below $9 \times 10^{-10}$, said monoacetylenic hydrocarbon having the formula $$R'—C≡C—R''$$

wherein R' and R'' are monovalent radicals selected from the class consisting of hydrogen and hydrocarbon radicals of not more than 6 carbon atoms.

19. A liquid coating composition comprising the cycloalkene reaction product obtained by reacting allene with acetylene at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$.

20. A liquid coating composition comprising a small amount of up to 2% by weight of a metal salt drier and the cycloalkene reaction product obtained by reacting allene with acetylene at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$.

21. Process for preparing methylene-substituted cycloalkenes which comprises contacting and reacting allene with a monoacetylenic hydrocarbon at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$, said monoacetylenic hydrocarbon having the formula R'—C≡C—R'' wherein R' and R'' are monovalent radicals selected from the class consisting of hydrogen and hydrocarbon radicals of not more than 6 carbon atoms.

22. Process for preparing methylene-substituted cycloalkenes which comprises contacting and reacting allene with acetylene at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$.

23. Process for preparing methylene-substituted cycloalkenes which comprises contacting and reacting allene, at a temperature of 20 to 150° C. under a pressure up to 300 lb./sq. in. and at least the autogenous pressure of the reactants under the reaction conditions in the presence of a catalyst comprising a nickel salt of a weak acid having a dissociation constant below $9 \times 10^{-10}$, with a monoacetylenic hydrocarbon having the formula R'—C≡CH wherein R' is a monovalent hydrocarbon radical of not more than 6 carbon atoms.

References Cited in the file of this patent

FOREIGN PATENTS 864,552    Germany _____ Jan. 26, 1953

OTHER REFERENCES

Bailey et al.: "Cyclic Dienes IX. Synthesis of 1,2-dimethylene-4 cyclohexene," JACS, January 5, 1955, page 73.